Patented Mar. 18, 1930

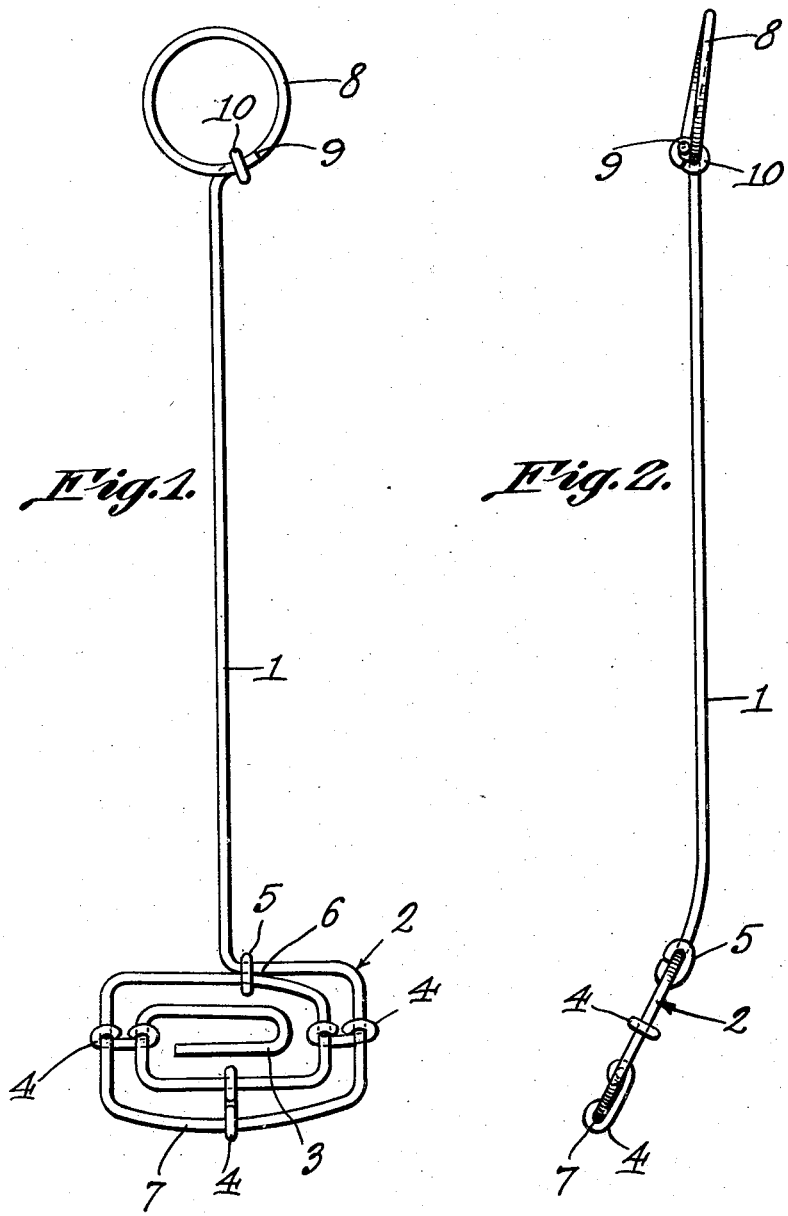

1,751,337

UNITED STATES PATENT OFFICE

ABRAHAM KRISBERG, OF MILWAUKEE, WISCONSIN

CLINKER SHOVEL

Application filed July 23, 1928. Serial No. 294,663.

This invention aims to provide a shovel which may be made simply out of a piece of wire, the shovel being adapted to be used primarily, for cleaning clinkers from a bed of coals in the fire place of a furnace or stove.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in elevation, a device constructed in accordance with the invention;

Figure 2 is an elevation wherein the structure is viewed at right angles to the showing of Figure 1.

The device forming the subject matter of this application may be made in any desired size. Preferably it is constructed out of wire and includes a handle 1 bent upon itself to form an oblong spiral net 2, as disclosed in Figure 1. The inner end of the part that forms the net is marked by the numeral 3, and is U-shaped. The convolutions of the net 2 are connected by links 4 and 5. The link marked by the numeral 5 is disposed close to the handle 1 and holds the outermost convolution and the next adjoining convolution in contact, as shown at 6.

The part of the net 2 that is opposite to the handle 1 is outwardly bowed, as shown at 7, to strengthen the net against strains put upon it when it is thrust into the hot coals, to get out a clinker. Part 2 is called a net because it is open to permit the passage of ashes, small coals, and everything but the clinker which is being shifted out of the fire.

The end of the handle 1, which is remote from the net 2 is formed into an eye or grip 8. The end of the grip 8 is overlapped on the body of the grip to form a shoulder 9. The grip or eye 8 is held closed by a binder 10 of wire, or in any other suitable way. It it to be observed that the net 2 is laterally inclined, Figure 2, with respect to the axis of the handle 1. This is done in order that the net may the more readily be introduced amongst the coals. When the operator takes hold of the grip 8 he can put his thumb or finger on the shoulder 9. The shoulder 9 is in the said side of the handle 1 as the laterally inclined net 2, and consequently, the operator, simply by feeling of the shoulder 9, can ascertain that the tool is in proper position for use: that is, that the tool is so positioned that the net 2 will be inclined in the right direction to work under the clinker that is to be withdrawn.

What is claimed is:—

A clinker shovel comprising a handle one end of which is provided with a net that is laterally inclined to one side of the axis of the handle, the other end of the handle being fashioned into a grip, and the extremity of the grip forming a shoulder, the shoulder being disposed on the same side of the axis of the handle as the net, so that when an operator takes hold the grip and feels the shoulder, he will know that the laterally inclined net is in proper position for use.

In testimony that I claim the foregoing as my own, I have hereto affixed my signature.

ABRAHAM KRISBERG.